United States Patent [19]

Eckler

[11] Patent Number: 4,676,912
[45] Date of Patent: Jun. 30, 1987

[54] WASTE LIQUOR DISPOSAL METHODS

[75] Inventor: Paul E. Eckler, Terre Haute, Ind.

[73] Assignee: International Minerals & Chemical Corp., Terre Haute, Ind.

[21] Appl. No.: 879,026

[22] Filed: Jun. 26, 1986

[51] Int. Cl.$^4$ ................................................ C02F 1/58
[52] U.S. Cl. ................................. 210/708; 210/725; 210/727; 210/729; 210/744; 210/774; 210/908
[58] Field of Search ............... 210/708, 749, 724–730, 210/769, 773, 774, 908, 909

[56] References Cited

U.S. PATENT DOCUMENTS

| 4,018,679 | 4/1977 | Bölsing | 210/751 |
| 4,043,908 | 8/1977 | Roberts et al. | 210/708 |
| 4,058,458 | 11/1977 | Svarz | 210/725 |
| 4,407,707 | 10/1983 | Merchant, Jr. et al. | 210/708 X |
| 4,451,267 | 5/1984 | Schwab et al. | 44/53 |
| 4,522,729 | 6/1985 | Tabler | 210/727 |
| 4,609,488 | 9/1986 | Geke et al. | 210/708 X |
| 4,636,318 | 1/1987 | Baker | 210/769 X |

OTHER PUBLICATIONS

Practical Emulsions, vol. II, chapters 7–8, by H. Bennett et al., discloses numerous gasoline and food emulsions.
Emulsion Technology, pp. 75–79 by H. Bennett discloses emulsifying methods and materials.

Primary Examiner—Tom Wyse
Attorney, Agent, or Firm—Wendell R. Guffey; Thomas L. Farquer

[57] ABSTRACT

Waste liquors from fermentation processes and other sources are disposed of by creating an oil-in-water emulsion and incinerating the emulsion.

20 Claims, No Drawings

WASTE LIQUOR DISPOSAL METHODS

This invention relates generally to methods for disposing of waste liquors and particularly to methods for disposing of aqueous waste liquors by producing a water in oil emulsion from the liquor and incinerating the resulting emulsion.

BACKGROUND OF THE INVENTION

The disposal of waste liquors containing dissolved organic and biochemical compounds is a continuing problem for a significant number of businesses, governmental agencies, and other concerns. Production of organic chemicals, pulp and paper, food, pesticides, pharmaceuticals, plastics, and hundreds of other products result in a large quantity of liquors that contain numerous organic and biochemical compounds. In addition, processing of animal wastes and sewage produces large quantities of liquors containing organic and biochemical waste materials. Chemical Oxygen Demand (COD) and Biological Oxygen Demand (BOD) are the standard methods for measuring the quantity of organic and biochemical compounds in waste liquors.

These liquors, which are mostly water, have traditionally been disposed of by dumping them into streams and other waterways. The COD and BOD of liquors going into streams as effluents, however, are regulated by the Environmental Protection Agency (EPA). Industries and other concerns that produce liquors that have a BOD or COD above the EPA limitation must reduce the BOD and COD level before disposing of the liquor in the stream or find alternative methods for disposing of the liquor.

Alternative methods to stream disposal for high BOD and COD liquors have generally involved storage of the liquor in drums until disposal or pumping the material into large lagoons. Startup and maintenance expenses for drum and lagoon storage facilities, however, can be very burdensome to the industry, particularly when the industry produces large quantities of liquors.

Incineration is a possible alternative, but large quantities of water in the liquor make the liquor unable to sustain or support combustion without the assistance of auxillary fuels.

A method is, therefore, needed which can provide an economical and efficient means for disposing of organic waste liquors. The method should be particularly useful for disposing of large quantities of liquors on-site, thereby avoiding the large costs associated with transportation or storage in drums or lagoons.

Methods for making emulsions and numerous emulsion compositions are well known in the prior art. H. Bennett, Emulsion Technology, Chemical Publishing Company, N.Y. 1943, pages 75–80 discloses numerous emulsifying methods and materials. U.S. Pat. No. 4,451,267 discloses a microemulsion made from vegetable oil and aqueous alcohol with trialkylamine surfactant as an alternative fuel for diesel engines. U.S. Pat. No. 4,083,698 discloses a method for making stable water-in-oil emulsions from a fuel, water, alcohol, and surfactant system.

SUMMARY OF THE INVENTION

It is, therefore, an object of the present invention to provide a method for disposing of waste liquors.

It is another object of the present invention to provide a method for disposing of organic waste liquors having a high BOD and COD.

It is another object of the present invention to provide a method for economically and efficiently disposing of waste liquors thereby avoiding the high costs of transportation and storage.

These and other objects are achieved by producing a water in oil emulsion from the organic waste liquor and incinerating the emulsion. The emulsion is produced by adjusting the pH of the liquor to about the neutral range (6–9), adding an amine, and mixing the amine/liquor mixture with an oil/fatty acid mixture to create an emulsion. An amine surfactant which forms from the amine/fatty acid mixture functions as an emulsifying agent. The emulsion is incinerated by known methods to dispose of the liquor.

In the preferred embodiment, ammonia is added to the liquor in sufficient quantities to adjust the pH to about 8, monomethylamine is added to the neutralized liquor, and the resulting mixture is mixed with No. 2 diesel fuel/tall oil fatty acid to produce the desired emulsion. The emulsion is subsequently incinerated thereby disposing of the liquor.

Other objects, advantages, and novel features of the present invention will become apparent from the following detailed description of the invention.

DETAILED DESCRIPTION OF THE INVENTION

According to the present invention, a liquor containing organic, biochemical, and other compounds is disposed of by forming a water in oil emulsion from the liquor and incinerating the resulting emulsion. The emulsion is formed by adjusting the pH to about 6-9 to neutralize the liquor, mixing the neutralized liquor with an amine, and mixing the neutralized liquor/amine mixture with a fuel oil/fatty acid mixture.

In general, this process is of greatest utility in the case of aqueous organic waste streams which are otherwise suitable for incineration but will not support combustion and are insoluble in fuel oil. The preferred waste stream is high in organics content and is low in ash components, including sodium, calcium, magnesium, iron, and other nonvolatile elements. Preferred waste streams typically contain greater than 30% solids by weight of organics. The economics of the process will improve as the solids content is increased until an upper limit, determined by the physical properties of the waste, is reached. Viscosity or excess crystallization are factors which impose an upper limit on the waste solids content. Solids may be present provided they are finely dispersed in the waste and do not plug fuel jets and lines.

The ash content of the waste is limited primarily by the ability of the incinerator to tolerate ash and fly ash, and to some extent by the influence of the ions on the stability of the emulsion. The limitations will vary from case to case, but as a guide, the preferred upper limit is 5% sulfated ash on a solids basis by the method of ASTM D-2195.

Typical wastes meeting these requirements are the mother liquors which remain after an organic solid is crystallized from water. Typical materials processed in this way include sucrose (table sugar), pentaerythritol, and numerous organics which are soluble in hot water.

An especially preferred group of waste streams includes those containing dissolved organic acids. Acids which are crystallized from water leaving acidic organic mother liquors include maleic acid, malic acid, tartaric acid, benzoic acid, toluenesulfonic acid, and especially dimethyolpropionic acid. Other acidic aqueous organic waste streams may also be incinerated with this process.

Any method well known to the skilled artisan can be used to adjust the pH including addition of bases such as sodium hydroxide (NaOH), potassium hydroxide (KOH), and the like. However, although these bases function well in forming the emulsion, they form salts that can clog in the incinerator when the emulsions are burned. Preferably, volatile bases such as ammonia and organic amines such as methylamines, ethylamines, propylamines, ethanolamines, propanolamines, and the like are used to adjust the pH since these amines will be incinerated along with the emulsion leaving no significant residue or ash.

Amines mixed with the neutralized liquor include but are not limited to monomethylamine, dimethylamine, trimethylamine, monoethanolamine, diethanolamine, triethanolamine, dimethylethanolamine, 2-amino-2-methyl-1-propanol, 2-amino-1-butanol, monoethylamine, diethylamine, triethylamine, and low molecular weight, water soluble amines. Commercially available aqueous solutions such as aqueous monomethylamine or 28% aqueous ammonia may also be used.

The same amine can be used to neutralize the liquor and mix with the neutralized liquor. This would essentially combine the first two steps of the process, although they could remain separate steps. Also, the use of anhydrous reagents, particularly amines, would decrease the amount of water present in the final mixture and increase the amount of liquor that could be disposed of by a given quantity of other reagents.

The oil used in the present invention can be any liquid fuel such as a high flashpoint hydrocarbon oil, preferably diesel fuel and most preferably No. 2 diesel fuel. Fuel oil in amounts from about 0.5–4.0 weights of fuel oil per weight of emulsion chemicals and neutralized liquor function well to form the emulsion of the present invention. Much higher ratios could be used but are not preferred because large equipment and more fuel oil must be used to emulsify a given volume of waste.

Saturated and unsaturated fatty acids having between 12 and 24 carbon atoms ($C_{12}$–$C_{24}$) can be used to form the emulsion. Natural fatty acids having between 12–20 carbon atoms are preferred because of their availability. Typical fatty acids include tall oil fatty acid and fatty acids obtained by hydrolysis of natural products including soybean oil, linseed oil, cottonseed oil, castor oil, walnut oil, fish oil, cocoanut oil, sunflower oil, peanut oil, or other vegetable oils or lard, tallow or other animal fats or greases. Also, by-product and waste stream fatty acids obtained in the processing of these oils may also be used. These by-products include but are not limited to distillation residues, tars, and acidulated waste soap stocks. Arizona FA-1 tall oil fatty acid (a by-product of papermaking) and Emery 979U (a waste oleic acid), fatty acid pitch, and distillation residues are preferred because of their low cost an availability.

The amount of each component in the final emulsion varies as follows based upon the parts by weight (pbw) of amine, fatty acid, and neutralized liquor (totalling 100 pbw): amine 10–30 pbw, fatty acid 30–75 pbw, and neutralized liquor 10–60 pbw. The amount of fuel oil is generally from about 0.5–4.0 times the total weight of the amine, fatty acid, and neutralized liquor, typically from about 50–400 pbw. However, unlimited amounts of fuel oil can be used, limited only by the need to keep the cost of disposal low.

The order of addition of the materials and the agitation rates are not critical factors in the preparation of the emulsions of the present invention. Only moderate agitation is needed to prepare the emulsions and either order of addition may be used; fatty acid in fuel oil to amine in liquor or amine in liquor to fatty acid in fuel oil. However, fuel oil cannot be omitted from the initial emulsion and the fatty acid must be dissolved in the fuel oil.

Various mechanical mixing machines can be used to aid in making the emulsions. Such machines include colloid mills, homogenizers, dispersers, blenders, and high speed and high shear stirrers. However, it should be emphasized that the emulsions of the present invention can be formed spontaneously or with only limited stirring.

An efficient incineration process which recovers the energy value of the incinerated waste consists of injecting the waste liquor emulsion into the fuel oil lines of a fuel oil fired steam boiler. The volume of fuel oil in these lines should be large compared to the volume of emusified waste liquor. For efficiency, the emulsion should be prepared in batches in mix tanks and transferred to hold tanks. The boiler addition should be made from the holdtanks. Continuous emulsification processes may also be used.

The invention having been generally described, the following examples are given as particular embodiments of the invention and to demonstrate the practice and advantages thereof. It is understood that the examples are given by way of illustration and are not intended to limit the specification or the claims to follow in any manner.

EXPERIMENTAL PROCEDURE

A series of experiments were carried out using the following general experimental procedure: (a) the liquor was neutralized to bring the pH to about 8, (b) the neutralized liquor and an amine agent were combined with stirring, (c) the fatty acid was dissolved in fuel oil, and (d) the liquor/amine mixture was added to the fuel oil/fatty acid mixture while mixing on a Premier Mill thereby forming an emulsion. Stability of the emulsions was evaluated by allowing to stand at ambient temperatures for at least 16 hours. The invert character of the emulsions was confirmed by dilution with additional fuel oil.

In the following examples the mother liquor treated was the byproduct from the production of dimethylopropionic acid (DMPA) as described in U.S. Pat. No. 3,312,736, incorporated herein by reference. The solids content was 79.58%, the neutralization equivalent was 273 (solids basis) and the sulfated ash analysis was 4.18%. For preparation of the emulsions, the mother liquor was adjusted to pH 8 by the addition of 28% aqueous ammonia. Acintol FA-1 (Arizona Chemicals), an economical tall oil fatty acid (TOFA), was used in most examples. Its moderate color (Gardner 8) facilitated the evaluation of emulsion stability. Comparative examples with Emery 979U, a black, opaque waste grade of oleic acid, available at fuel oil prices, demonstrate that similar emulsions can be prepared with it. Commercial number 2 diesel fuel was used as the oil.

In all the examples the sum of the parts by weight (pbw) of the neutralized liquor, amine, and fatty acid totals 100 pbw. The amount of fuel oil is about 0.5–4 times the sum of the weights of the neutralized liquor, amine, and fatty acid (50–400 pbw).

EXAMPLE 1

A stable microemulsion was prepared by combining 56 pbw TOFA and 300 pbw fuel oil and adding a solution of 24 pbw triethanolamine in 20 pbw of neutralized DMPA mother liquor while mixing on a Premier Mill. The emulsion was transparent, could be diluted with additional fuel oil, and gave no indications of separation on standing.

EXAMPLE 2

A composition was prepared as described in Example 1 using 54 parts TOFA in 289 parts fuel oil and 23 parts triethanolamine in 23 parts of mother liquor. A stable transparent liquid emulsion was obtained, which could be diluted with fuel oil and was of low viscosity.

EXAMPLE 3

A composition was prepared as described in Example 1 using 47 parts TOFA in 251 parts fuel oil and 20 parts triethanolamine in 33 parts of mother liquor. An unstable, hazy emulsion formed which began separating into two liquid phases within 10 minutes.

EXAMPLE 4

A composition was prepared as described in Example 1 using 35 parts TOFA in 188 parts fuel oil and 15 parts triethanolamine in 50 parts of mother liquor. An unstable, hazy emulsion formed which began separating into 2 liquid phases within 10 minutes.

EXAMPLE 5

A composition was prepared as described in Example 1 using 75 parts TOFA in 100 parts fuel oil and 13 parts triethanolamine in 12 parts mother liquor. A stable low viscosity emulsion was formed which could be diluted with fuel oil.

EXAMPLE 6

A composition was prepared as described in Example 1 using 75 parts TOFA in 300 parts fuel oil and 8 parts triethanolamine in 17 parts mother liquor. A hazy, semi-stable emulsion was obtained which could be diluted with fuel oil. No separation was observed after 6 hours, but significant separation was observed after 20 hours.

EXAMPLE 7

A composition was prepared as described in Example 1 using 73 parts TOFA in 396 parts fuel oil and 27 parts of mother liquor omitting triethanolamine. The mixture separated rapidly after agitation was discontinued.

EXAMPLE 8

A composition was prepared as described in Example 1 using 80 parts fuel oil with no TOFA and 55 parts triethanolamine in 45 parts mother liquor. The mixture separated rapidly after agitation was discontinued.

EXAMPLE 9

A composition was prepared as described in Example 1 using 59 pbw Emery 979U in 200 parts fuel oil and 22 parts triethanolamine in 19 parts mother liquor. An intensely dark but stable emulsion was obtained which could be diluted with fuel oil.

EXAMPLE 10

A series of compositions were prepared to test the suitability of amines other than triethanolamine and especially to identify amines that would reduce the cost of incineration chemicals by increasing the amount of mother liquor which could be tolerated in the emulsion while retaining adequate stability. The formulation used was that of Example 3, in which triethanolamine has been shown to give an unstable emulsion. The compositions were prepared as described in Example 1 using 47 parts TOFA in 100 parts fuel oil and 20 parts amine in 33 parts mother liquor. The results are summarized in Table 1:

TABLE 1

DMPA MOTHER LIQUOR/FUEL OIL EMULSIONS TESTED (A)

| Amine | Emulsion | Oil Dilution (D) |
|---|---|---|
| 2-Amino-1-butanol | No | — |
| 2-Amino-2-methyl-1-propanol | Yes | Fail |
| Ammonia, 28% | Yes (C) | Hazy (E) |
| Diethanolamine | Yes (B) | Pass (E) |
| 2-(N,N—dimethyl)-ethanolamine | Yes | Pass (E) |
| Monomethylamine, 40% | Yes (B) | Pass (E) |
| Triethanolamine | No | — |
| Tris(hydroxymethyl)amino-methane, 50% | No | — |

NOTES:
(A) - Test composition: 47 pbw TOFA, 33 pbw neutralized DMPA mother liquor, 20 pbw amine, tested with 100 pbw fuel oil.
(B) - Clear high viscosity emulsion.
(C) - White, opaque, high viscosity emulsion (like mayonnaise).
(D) - Tested by dilution with fuel oil. Pass indicates soluble, invert emulsion.
(E) - Also dilutable with water.

Referring to Table 1, 2-amino-2-methyl-1-propanol gave a good quality stable emulsion of slightly increased viscosity. The emulsion could not be diluted with fuel oil and was therefore unsuitable for incineration as described. On dilution with water, the emulsion slowly separated. 2-Amino-1-butanol produced an emulsion which separated rapidly when agitation was discontinued. Tris(hydroxymethyl)-aminomethane (50% in water) produced an emulsion which separated rapidly when agitation was discontinued. Diethanolamine produced a stable emulsion of very high viscosity which could be diluted with either water or fuel oil. Monomethylamine produced a stable emulsion of very high viscocity which could be diluted with either water or fuel oil. Triethanol amine produced an emulsion which separated rapidly when agitation was discontinued. Ammonia (28% in water) produced a white paste, mayonnaise like emulsion which was stable and could be diluted with either water or fuel oil. 2-(Dimethylamino)-1-ethanol produced a stable emulsion of slightly increased viscosity which could be diluted with either water or fuel oil.

EXAMPLE 11

A composition was prepared by the method described in Example 1 using 42 parts TOFA in 150 parts fuel oil and 18 parts 40% aqueous monomethylamine (MMA) in 40 parts mother liquor. A stable, gel-like high viscosity emulsion was obtained which could be diluted with fuel oil. After dilution, the phase separation occurred slowly.

EXAMPLE 12

A composition was prepared as described in Example 1 using 35 parts TOFA in 150 parts fuel oil and 15 parts MMA in 50 parts mother liquor. A somewhat hazy, emulsion of limited stability was obtained which slowly separated into layers after dilution with fuel oil.

EXAMPLE 13

A composition was prepared as described in Example 1 using 28 parts TOFA in 150 parts fuel oil and 12 parts MMA in 60 parts mother liquor. An unstable emulsion was obtained which began separating immediately when agitation was discontinued.

EXAMPLE 14

A composition was prepared as described in Example 1 using 41 parts TOFA in 150 parts fuel oil and 9 parts MMA in 50 parts mother liquor. An unstable emulsion was obtained which separated rapidly when stirring was discontinued.

EXAMPLE 15

A composition was prepared as described in Example 1 using 27 parts TOFA in 150 parts fuel oil and 23 parts MMA in 50 parts mother liquor. An unstable emulsion was obtained which separated rapidly when stirring was discontinued.

EXAMPLE 16

A composition was prepared as described in Example 1 using 38 parts TOFA in 150 parts fuel oil and 17 parts MMA in 45 parts mother liquor. A stable emulsion was obtained which separated slowly after dilution with fuel oil.

EXAMPLE 17

A composition was prepared as described in Example 1 using 37 parts TOFA in 150 parts fuel oil and 15 parts MMA in 45 parts mother liquor. An unstable emulsion was obtained which separated rapidly when stirring was discontinued.

EXAMPLE 18

A composition was prepared as described in Example 1 using 45 parts TOFA in 150 parts fuel oil and 12 parts MMA in 43 parts mother liquor. A low viscosity stable emulsion was obtained. On standing a small upper layer separated slowly.

EXAMPLE 19

A composition was prepared as described in Example 1 using 41 parts TOFA in 150 parts fuel oil and 11 parts MMA in 48 parts mother liquor. A low viscosity stable emulsion was obtained. On standing a small upper layer separated slowly.

EXAMPLE 20

Example 11 was repeated substituting Emery 979U for TOFA. A very dark stable emulsion was obtained.

EXAMPLE 21

A composition was prepared as described in Example 1 using 42 parts TOFA in 140 parts fuel oil and 18 parts MMA in 40 parts mother liquor. A somewhat hazy, slightly viscous stable emulsion was obtained.

EXAMPLE 22

Example 20 was repeated except that the TOFA/fuel oil solution was added to the MMA/mother liquor solution (reversing the order of addition). The emulsion obtained was identical to the one described in Example 20.

Obviously many modifications and variations of the present invention are possible in light of the above teachings. It is therefore to be understood that within the scope of the appended claims the invention may be practiced otherwise than as specifically described.

I claim:

1. A method for disposing of a waste liquor comprising the steps of:
   neutralizing said liquor by adjusting the pH to about 6–9;
   mixing said neutralized liquor with an amine; and
   mixing said neutralized liquor/amine mixture with a fuel oil/fatty acid mixture thereby creating a water and oil emulsion; and
   incinerating said emulsion.

2. The method of claim 1 wherein said amine, fatty acid, and neutralized liquor are mixed in the following porportions based upon a total of 100 parts by weight (pbw):
   amine 10–30 pbw,
   fatty acid 30–75 pbw, and
   neutralized liquor 10–60 pbw.

3. The method of claim 2 wherein the amount of fuel oil is about 0.5–4 times the sum of the weights of the neutralized liquor, amine, and fatty acid (50–400 pbw).

4. The method of claim 2 wherein the amount of fuel oil is about 0.5–4 times the sum of the weights of the neutralized liquor, amine, and fatty acid (50–400 pbw).

5. The method of claim 1 wherein said waste liquor is acidic and said pH is adjusted by the addition of an amine to said liquor.

6. The method of claim 1 wherein said waste liquor is acidic and said pH is adjusted by the addition of ammonia to said liquor.

7. The method of claim 1 wherein said amine mixed with said neutralized liquor is selected from the group consisting of dimethylamine, trimethylamine, monoethanolamine, diethanolamine, triethanolamine, dimethylethanolamine, 2-amino-2-methyl-1-propanol, 2-amino-1-butanol, monoethylamine, diethylamine, and, triethylamine.

8. The method of claim 1 wherein said amine mixed with said neutralized liquor is monomethylamine.

9. The method of claim 1 wherein said fatty acid in said fuel oil/fatty acid mixture is selected from the group consisting of saturated and unsaturated fatty acid having between 12 and 24 carbon atoms ($C_{12}$–$C_{24}$).

10. The method of claim 9 wherein said fatty acid in said fuel oil/fatty acid mixture is tall oil fatty acid.

11. The method of claim 1 wherein said fuel oil in said fuel oil/fatty acid mixture is diesel fuel.

12. The method of claim 1 wherein the same amine is used to adjust said pH and to mix with said neutralized liquor.

13. The method of claim 1 wherein the liquor is the byproduct from the production of dimethylopropionic acid.

14. A method for disposing of an acidic waste liquor comprising the steps of:
   neutralizing said liquor by adding ammonia, monomethylamine, or an amine selected from the group consisting of dimethylamine, trimethylamine, monoethanolamine, diethanolamine, triethanolamine, dimethylethanolamine, 2-amino-2-methyl-1-propanol, 2-amino-1-butanol, monoethylamine, diethylamine, and, triethylamine to adjust the pH to about 6–9;

mixing said neutralized liquor with monomethylamine or an amine selected from the group consisting of dimethylamine, trimethylamine, monoethanolamine, diethanolamine, triethanolamine, dimethylethanolamine, 2-amino-2-methyl-1-propanol, 2-amino-1-butanol, monoethylamine, diethylamine, and, triethylamine; and mixing said neutralized liquor/amine mixture with a fuel oil/saturated and unsaturated fatty acid having between 12 and 24 carbon atoms ($C_{12}$–$C_{24}$) mixture thereby creating a water and oil emulsion; and incinerating said emulsion.

15. The method of claim 14 wherein said amine, fatty acid, and neutralized liquor are mixed in the following porportions based upon a total of 100 parts by weight (bpw):

amine 10–30 pbw,
fatty acid 30–75 pbw, and
neutralized liquor 10–60 pbw.

16. The method of claim 14 wherein the amount of fuel oil is about 0.5–4 times the sum of the weights of the neutralized liquor, amine, and fatty acid (50–400 pbw).

17. The method of claim 14 wherein said fatty acid in said fuel oil/fatty acid mixture is tall oil fatty acid.

18. The method of claim 14 wherein the liquor is the byproduct from the production of dimethylopropionic acid.

19. A method for disposing of a dimethylopropionic acid (DMPA) waste liquor comprising the steps of:

neutralizing said DMPA liquor by adding ammonia to adjust the pH to about 6–9;

mixing said neutralized DMPA liquor with monomethylamine; and mixing said neutralized DMPA liquor/monomethylamine mixture with a fuel oil/tall oil fatty acid mixture thereby creating a water and oil emulsion; and incinerating said emulsion.

20. The method of claim 14 wherein said monomethylamine, tall oil fatty acid, and neutralized DMPA liquor are mixed in the following porportions based upon a total of 100 parts by weight (bpw):

monomethylamine 10–30 pbw,
tall oil fatty acid 30–75 pbw, and
neutralized DMPA liquor 10–60 pbw.

* * * * *

UNITED STATES PATENT AND TRADEMARK OFFICE
CERTIFICATE OF CORRECTION

PATENT NO. : 4,676,912

DATED : June 30, 1987

INVENTOR(S) : Paul E. Eckler

It is certified that error appears in the above-identified patent and that said Letters Patent are hereby corrected as shown below:

Column 1, line 46, "auxillary" should read -- auxiliary --

Column 3, line 52, "cocoanut" should read -- coconut --

Column 4, line 15, "homogonizers" should read -- homogenizers --

Column 4, line 25, "emusified" should read -- emulsified --

Column 5, line 19, "viscocity" should read -- viscosity --

Column 5, line 40, "viscocity" should read -- viscosity --

Column 6, line 44, "viscocity" should read -- viscosity --

Column 6, line 47, "viscocity" should read -- viscosity --

Column 6, line 54, "viscocity" should read -- viscosity --

Column 7, line 62, "viscous" should read -- viscuous --

Claim 2, line 3, "porportions" should read -- proportions --

Claim 13, line 2, "dimethylopropionic" should read -- dimethylolpropionic --

Claim 18, line 2, "dimethylopropionic" should read -- dimethylolpropionic --

Claim 19, line 1, "dimethylopropionic" should read -- dimethylolpropionic --

Claim 20, line 3, "porportions" should read -- proportions --

Signed and Sealed this

Seventh Day of June, 1988

*Attest:*

DONALD J. QUIGG

*Attesting Officer*   *Commissioner of Patents and Trademarks*